United States Patent

Schnell et al.

[15] 3,688,289

[45] Aug. 29, 1972

[54] MAGNETIC DISC PACK AND ARRANGEMENT FOR AERATING THE SAME

[72] Inventors: Georg Schnell, 21 Freinsheimer Strasse; Josef Woellhaf, 1 Huettenmuellerstrasse; Volker Richter, 11 Krainchstrasse, all of Ludwigshafen; Gerd Schumacher, 18 Fuellenweg, 6800 Manheim; Erich Albert Sobotta, 17 Am Baechenbuckel, Ziegelhausen, all of Germany

[22] Filed: May 10, 1971

[21] Appl. No.: 141,628

[30] Foreign Application Priority Data

May 13, 1970 Germany P 20 23 236.4

[52] U.S. Cl. ........................340/174.1 E, 340/174.1 C, 346/74 MD, 346/137

[51] Int. Cl. ...............................................G11b 5/82

[58] Field of Search................179/100.2 A; 340/174.1 C, 174.1 E; 346/74 MD, 137

[56] References Cited

UNITED STATES PATENTS

| | | | |
|---|---|---|---|
| 3,487,390 | 12/1969 | Klinger et al | 340/174.1 C |
| 3,509,992 | 5/1970 | David et al | 340/174.1 C |

*Primary Examiner*—J. Russell Goudeau
*Attorney*—Johnston, Root, O'Keeffe, Keil, Thompson & Shurtleff

[57] ABSTRACT

A magnetic disc pack, particularly a split disc pack, comprising means for protecting the disc surfaces from dust and dirt particles and, in addition, means for aerating the spaces between the discs from above the below the latter.

4 Claims, 1 Drawing Figure

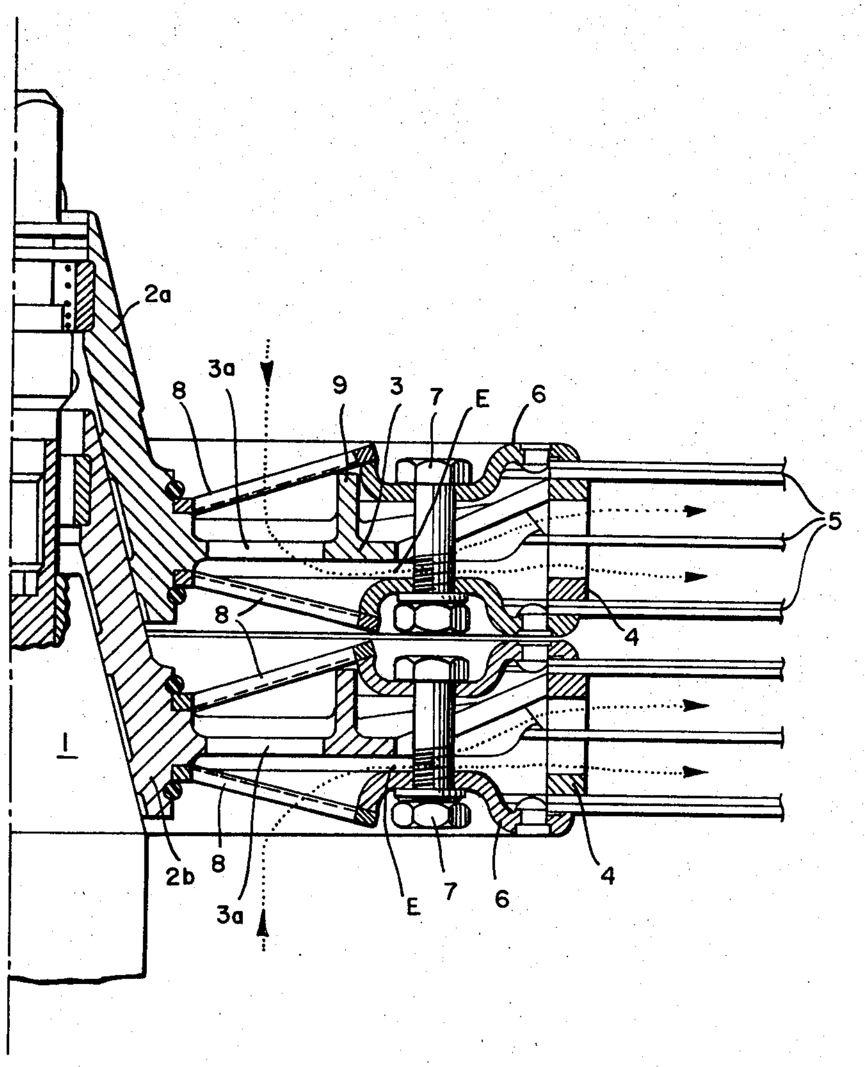
INVENTORS:
GEORG SCHNELL
JOSEF WOELLHAF
VOLKER RICHTER
GERD SCHUHMACHER
ERICH ALBERT SOBOTTA
BY
Johnston, Root, O'Keeffe, Keil, Thompson & Shurtleff
ATT'YS

MAGNETIC DISC PACK AND ARRANGEMENT FOR AERATING THE SAME

The present invention relates in general to magnetic disc packs which rotate on the drive spindle of data processing machines, and in particular to the aeration of the spaces (for accommodating the flying magnetic heads) of disc packs having a single hub (hereinafter referred to as single disc packs) and/or preferably split disc packs, both consisting of a plurality of discs.

Magnetic disc packs are known through whose spaces for accommodating the magnetic heads there is guided a stream of air which is introduced from below approximately parallel to the drive spindle, i.e., past the hub into the disc pack and, after redirection and distribution, leaves the rotating pack through the said spaces in a radial direction. This stream of air passes through an annular filter element arranged at the lower side of the disc pack between hub and the clamping rings supporting the discs and ensures the predetermined flying position of the magnetic heads between the individual discs above the magnetic coating according to essentially aerodynamic principles. Fine cloths stretched over annular frames are usually used as filter elements. The memory component is so designed that the air stream can only enter the pack through these filter elements so that there is as little dust as possible in the vicinity of the flying magnetic heads. To increase the storage capacity of memories, disc packs consisting of, for example, 11 discs stacked one above the other are used nowadays. It is easy to see that in the case of such disc packs a stream of air which is only introduced from below and redirected inside the pack cannot be distributed evenly at all levels and under all operating conditions and consequently results in varying thermal conditions.

Furthermore, it is also known to construct split disc packs, i.e., to arrange an even or uneven number of discs on split hub units. Two such hub units together with the discs attached thereto then form a magnetic disc pack of standard size, the upper and lower memory components being interchangeable and utilizable with one another.

The object of the invention is to aerate single or split disc packs consisting of a plurality of stacked discs in such a way that all the spaces between the individual discs are flushed with amounts of air which are as near as possible identical, the interchangeability of the memory compounds in the case of split disc packs being at the same time guaranteed. A further requirement placed on disc packs consisting of a plurality of discs is that each of the discs should thermally expand very uniformly independent of its position within the pack and that the thermally stationary state should be reached within as short a time as possible. The aeration system according to this invention meets this requirement much better than the systems hitherto used in disc packs.

Generally, this object is achieved by introducing a stream of air into the disc pack from above and below. In the case of a split disc pack an upper and lower filter element is provided per memory component. In the case of a single disc pack the design is the same but the cross section of the air inlets is increased, the space enclosed between the filter elements being partially bounded according to this invention toward the outside by an annular rib situated approximately at right angles to the plane of the discs so that the stream of air flows past this rib as if it were passing through a nozzle and, by virtue of the specific width of the gap located at this point, is accelerated to a specific velocity for distribution to the individual spaces between the discs. This arrangement, in the case of a split disc pack having an upper and lower filter element per memory component, guarantees the uniform aeration of each component regardless of whether it is at the top or the bottom.

The invention will now be further described by way of example with reference to the accompanying drawing which is a fragmentary cross-sectional view of a split disc pack consisting of two memory components with three discs each.

The hubs *2a* and *2b* of identical shape of a split disc pack are mounted on the conical seat of the drive spindle 1 of the data processing machine. The conical portion of the hub merges in a radial direction and into a plate-shaped ring 3 having a plurality of openings and which supports the magnetic discs either directly or via annular spacers 4. The discs 5 and the plate-shaped ring 3 of each memory component are clamped together by means of clamping rings 6 having a trough-shaped profile. The heads of the bolts and the nuts 7 are located in the troughs of the clamping rings 6 so that the split disc pack can be constructed with the discs the same distance apart as those of, for example, a single disc pack consisting of 11 discs.

There are two filter elements 8 per memory component which cover the annular region between the hubs *2a* and *2b* and the clamping rings 6 and which are arranged in this region approximately symmetrically to the plane of the perforated plate-shaped ring 3. The annular filter elements enclose an annular space whose width, viewed in an axial direction, is larger at the external diameter of these filter elements than at the point at which the stiff inner edges of each filter element rest on corresponding shoulders on the hubs *2a* and *2b*. In other words, the surfaces of the filter elements diverge from the inside toward the outside, the maximum distance between the filter elements being approximately the height of the disc pack or memory component. The center of gravity of each disc pack or memory component can be determined without taking the solid hub into account. A disc pack according to this invention is so constructed that the plate-shaped ring 3 in the region of the space bounded toward the outside by the filter elements 8 is situated approximately in the plane of the center of gravity of the disc pack. Moreover, the space between the two filter elements 8 arranged symmetrically to the plane of the center of gravity in approximately mirror-image relationship is partially bounded toward the outside by an approximately vertical annular rib 9 so that the air streams entering the filters from above and below pass through a nozzle-like constriction E in a radial direction toward the outside. The annular rib 9 is also used for having weights attached to it or holes drilled in it in order to statistically and dynamically balance the assembled disc pack. The plane for the weights or perforations is advantageously in the vicinity of the upper disc in each case, the height of the rib 9 being dimensioned accordingly.

The aeration system for the above-described split disc pack is therefore as follows:

Due to the rotation of the disc pack a stream of air enters the uppermost and lowermost filter elements 8, the upper air stream passing through the openings *3a* in the plate-shaped ring 3 and being redirected below the annular rib 9. The air stream entering from below flows along immediately below the lower surface of the plate-shaped ring 3, passes through the openings in the annular spacers 4, i.e., the region of the greatest diameter of the rings, with the formation of sub-streams which then flow in a radial direction into the spaces between the discs 5 for accommodating the magnetic heads toward the outside. It is clear from the drawing that the aeration system is effective regardless of the operating position of each of the memory components. Moreover, this system is equally effective in the case of a single disc pack, e.g., one having 11 discs, having an upper and lower filter element through which the air is introduced initially in an axial direction followed by distribution and redirection. It is obvious that the individual spaces between the discs, independent of the height of the pack, can be aerated better with this system than with one in which air is only drawn in from below and distributed throughout the whole pack.

It can also be seen from the drawing that in the case of two interchangeable memory components rotating on the same drive spindle 1 and having two filter elements 8 each the uppermost and lowermost filter elements serve as inlets for the air introduced from above and below, whereas the two innermost filter elements remain substantially inoperative.

We claim:

1. A magnetic disc pack comprising a single hub, a perforated plate-shaped ring integral therewith, clamping rings for holding one or more magnetic discs and upper and lower filter elements which cover the openings in said ring and are arranged between said hub and said clamping rings, the distance between said filter elements being greater at said clamping rings than at said hub, said filter elements being arranged symmetrically to the center of gravity of the disc pack in mirror-image relationship, and said ring integral with said hub having an annular rib arranged approximately at right angles to the plane of said magnetic discs as a boundary for the air inlet zone.

2. A split magnetic disc pack comprising a plurality of hubs, perforated plate-shaped rings integral therewith, clamping rings for holding one or more magnetic discs and upper and lower filter elements which cover the openings in said rings and are arranged between each hub and the corresponding clamping rings, the distance between said filter elements being greater at the clamping rings than at the hub, said filter elements being arranged symmetrically to the center of gravity of each memory component in mirror-image relationship, said rings integral with said hubs having an annular rib arranged approximately at right angles to the plane of said magnetic discs as a boundary for the air inlet zones.

3. A magnetic disc pack as claimed in claim 1, wherein the rib on the perforated plate-shaped ring integral with the hub closes, in a radial direction, the space between the filter element and the opening in said ring covered by said filter element, and a nozzle-like constriction is formed between the lower surface of said ring and the lower clamping ring.

4. A magnetic disc pack as claimed in claim 1 having two memory components arranged one above the other, the inlets for the air streams being formed by the outermost filter elements and the openings in the plate-shaped rings covered by said filter elements.

* * * * *

PO-1050
(5/69)

UNITED STATES PATENT OFFICE
CERTIFICATE OF CORRECTION

Patent No. 3,688,289 Dated August 29, 1972

Inventor(s) Georg Schnell et al

It is certified that error appears in the above-identified patent and that said Letters Patent are hereby corrected as shown below:

Cover page, left hand column, insert -- [73] ASSIGNEE: Badische-Anilin-&Soda-Fabrik Aktiengesellschaft, Ludwigshafen am Rhein , Germany --

Signed and sealed this 10th day of April 1973.

(SEAL)
Attest:

EDWARD M.FLETCHER,JR.
Attesting Officer

ROBERT GOTTSCHALK
Commissioner of Patents